(No Model.)

J. P. MICHAELS.
EYEGLASSES.

No. 298,490. Patented May 13, 1884.

Witnesses.
John F. C. Prinkert
Henry March

Inventor.
Joseph P. Michaels
by Crosby Gregory attys

UNITED STATES PATENT OFFICE.

JOSEPH PORTER MICHAELS, OF PARIS, FRANCE, ASSIGNOR OF ONE-HALF TO WILLIAM R. DONOVAN, OF BOSTON, MASSACHUSETTS.

EYEGLASSES.

SPECIFICATION forming part of Letters Patent No. 298,490, dated May 13, 1884.

Application filed February 29, 1884. (No model.) Patented in France July 3, 1883, No. 143,994.

*To all whom it may concern:*

Be it known that I, JOSEPH PORTER MICHAELS, a citizen of the United States, but temporarily residing in Paris, France, have invented an Improvement in Eyeglasses, of which the following description, in connection with the accompanying drawings, is a specification, like letters on the drawings representing like parts.

This invention is an improvement on that class of eyeglasses wherein the nose-pieces are connected with the frames at a point above and below the center or major axis of the glasses, and wherein the said nose-pieces are of a gradually-increasing width from bottom to top, to conform to the anatomy of the nose.

My invention relates, especially, to the construction of the nose-pieces, whereby they may be readily moved or adjusted angularly or transversely with relation to the frames and their contained glasses, to enable the nose-pieces to be placed more or less farther back upon the bridge of the nose, or into the space or hollow between the nose and eyes, so as to be readily made to conform to the anatomy of the nose, and thus obtain a proper position and greater stability upon the nose of the wearer and to augment the holding-power of the contracting-spring. Further, the main metallic parts of the nose-pieces are so warped or twisted between their ends where they are pivoted to lugs on the frame that the nose-engaging laminæ, of horn, rubber, or other suitable material, are enabled to present their broad faces against the nose in the different adjustments of the nose-pieces.

To these ends my invention consists, primarily, in an eyeglass having nose-pieces pivoted to the frames at a point above and below the center or major axis of the glasses, and adapted to be moved angularly or transversely with relation to the frames and their contained glasses; and, secondly, of an eyeglass having metallic nose-pieces pivotally connected with the frames or to lugs formed thereon at a point above and below the major axis of the glasses, and warped or twisted between their pivotal points, and adapted to be moved angularly with relation to the frames and contained glasses, and to present the broad faces of the nose-engaging laminæ of said nose-pieces against the nose in the different adjustments of said nose-pieces, substantially as hereinafter described, and particularly pointed out in the claims.

Figure 1:
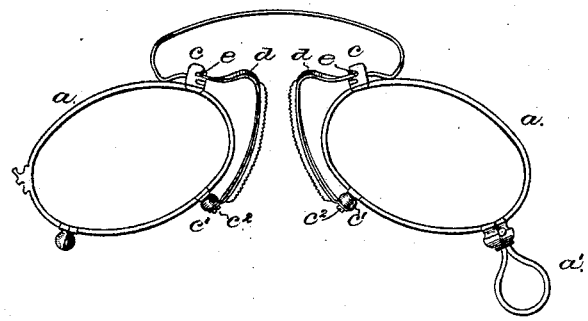
Figure 2:

Figure 1 is an elevation of a pair of eyeglasses containing my invention; and Fig. 2, a plan thereof with the contracting-spring removed to more clearly show the warped or twisted metallic nose-pieces in their normal position, and showing in dotted lines a second position of the nose-pieces, wherein they are disposed angularly with relation to the frame.

The frames $a$, containing glasses and provided with a handle, $a'$, and the contracting-spring $b$, may be of any suitable construction. Lugs $c$ $c'$ are formed upon each of the frames $a$, the former at a point above and the latter below the center or major axis of the glasses contained in the frames, the lugs $c'$ retaining the lower ends of the nose-pieces $d$, which are pivotally connected therewith by means of the pivots or screws $c^2$, and the lugs $c$ receiving the upper ends of said nose-pieces, which, together with the ends of the contracting-spring $b$, are held thereto by means of the pivots or screws $c^3$. In the present instance each of the upper lugs, $c$, has a recess or groove in its top surface substantially of the width of the contracting-spring which rests in the recess, the purpose of which being to prevent play of the spring and retain it firmly in place. A mortise or slit, $e$, in one side of the lugs $c$ communicates with the recess or groove, to permit transverse or angular movement of the nose-pieces with relation to the frames, the said nose-pieces entering such side slots when moved to the position shown in dotted lines in Fig. 2, the ends of the nose-pieces $d$ having free movements on their pivots in the lugs $c$ at that end. As clearly indicated in the drawings, the nose-pieces $d$ are so warped or twisted between their ends, where they are pivoted to the lugs on the frames, that the nose-engaging laminæ, of horn, rubber, or other suitable material, secured to the nose-pieces, are enabled to present their broad faces against the nose whatever may be the adjustment of said nose-pieces with relation to the frames or their glasses. By pivoting the nose-pieces to the frames in the manner shown and described, the said nose-pieces are enabled to be adjusted transversely or angularly with relation to the frames, so as to conform to the anatomy of the nose and to be firmly seated or saddled thereon at the root or base, whereby the stability of the eyeglass is increased and the holding-power of the contracting-spring augmented, while the said adjustable nose-pieces serve as regulators to insure the glasses being always held at the same distance from the eyes.

When a proper adjustment is obtained, the parts may be firmly held in such position by tightening the pivotal screws, the glasses being easily folded in the usual manner, whatever may be the adjustment of the nose-pieces with relation to the frames.

I claim—

1. The combination, with the frames to contain glasses, of nose-pieces pivoted at both ends to said frames, whereby they are adapted to be moved angularly or transversely with relation to said frames, for the purpose specified.

2. In eyeglasses, metallic nose-pieces pivoted to the frames to contain the glasses, and warped or twisted between their pivotal points, substantially as described, and adapted to be moved angularly with relation to the frames, and to present the faces of the nose-pieces or the nose-engaging laminæ, of rubber, horn, or other suitable material, which may be secured to said nose-pieces, against the nose, substantially in the manner and for the purpose specified.

3. In eyeglasses, the frames $a$, having lugs $c$ $c'$, the said lugs $c$ $c'$ provided with the grooves and mortises or slots, as set forth, the nose-pieces $d$, pivoted to the said lugs $c$ $c'$, the spring $b$, firmly held in the grooves of the lugs $c$, and the holding-screws, combined in the manner and for the purposes set forth.

4. In an eyeglass, the combination, with the frames having the lugs $c$ $c'$, the said lug $c$ provided with the slots or mortises in one side thereof, as described, of nose-pieces pivoted to the lugs $c$ $c'$, and adapted to be moved transversely or angularly with relation to the frames and enter the slots or mortises in said lugs $c$, and suitable retaining screws or pivots, substantially as described, and for the purpose set forth.

In testimony whereof I have signed my name to this specification in the presence of two subscribing witnesses.

JOSEPH PORTER MICHAELS.

Witnesses:
JOHN W. CRANE,
ANTOINE FAGGIANELLI.